United States Patent [19]
Minemoto et al.

[11] Patent Number: 5,167,000
[45] Date of Patent: Nov. 24, 1992

[54] OPTICAL WAVELENGTH CONVERTER

[75] Inventors: Hisashi Minemoto, Kyoto; Tatsurou Kawamura, Takatsuki; Katsuya Wakita, Nara; Nobuo Sonoda, Settsu, all of Japan

[73] Assignee: Matsushita Electric Industrial Co. Ltd., Kadoma, Japan

[21] Appl. No.: 751,315

[22] Filed: Aug. 28, 1991

[30] Foreign Application Priority Data

Aug. 28, 1990 [JP] Japan .................. 2-227024

[51] Int. Cl.⁵ .............................. G02F 1/37
[52] U.S. Cl. .................. 385/122; 359/328; 385/143
[58] Field of Search .............. 359/326-332; 385/122, 123, 141-143

[56] References Cited

U.S. PATENT DOCUMENTS

| | | | |
|---|---|---|---|
| 4,659,177 | 4/1987 | Choe et al. | 385/143 |
| 4,719,281 | 1/1988 | Choe | 359/326 X |
| 4,893,888 | 1/1990 | Okazaki et al. | 359/328 X |

OTHER PUBLICATIONS

T. Kondo et al., Jap. Jour. of Appl. Phy. vol. 28, No. 9, Sep., 1989, pp. 1622-1628.
S. Umegaka et al, Proces. of SPIE 682, 1986, pp. 187-190.
D. S. Chemla et al., "Non-Linear Opt. Prop. of Organic Mol. . . . vol. 1", 1987, *Academic Press*, pp. 248-255.

*Primary Examiner*—John D. Lee
*Attorney, Agent, or Firm*—Ratner & Prestia

[57] ABSTRACT

A nonlinear optical device is provided which uses nonlinear optical materials that transmit a fundamental wave and generated higher harmonics, and have optical absorption maximums based on an electronic transition between wavelengths of the fundamental wave and the generated higher harmonics. Therefore, by emitting higher harmonics having a wavelength within an optical transmission region between wavelengths of the two optical absorption maximums, materials can be used which have a long wavelength at their absorption edge and a large $\beta$ value which have been considered unsuitable in the prior art. As a result, a device with high conversion efficiency can be realized.

3 Claims, 3 Drawing Sheets

OPTICAL WAVELENGTH CONVERTER

BACKGROUND OF THE INVENTION

1. Field of the Invention

The present invention relates to a nonlinear optical device used for converting optical wavelength utilizing nonlinear optical effect and its material.

2. Description of the Prior Art

In recent years, there have been proposed various devices using the large nonlinear optical effect and the high speed response of organic nonlinear optical materials.

Especially, an optical wavelength converter utilizing second-order nonlinear optical property has been a focus of study as light sources, etc., for an optical disc driver, a laser beam printer, and so on, because such a converter can be utilized for making the wavelength of a semiconductor laser light shorter.

A nonlinear optical waveguide device for converting optical wavelength has high electric field strength in the waveguide, which enables the propagation of light over a long distance, thereby promising high efficiency of converting a fundamental wave to higher harmonics.

When optical wavelengths are converted in a waveguide device, as a phase matching process, there have been proposed phase matching between modes (see e.g., Optics Communications 47, 347-350 (1983); Optics Communications, 59, 299-303, (1986)), and a process utilizing Cherenkov radiation (see e.g., Japanese Journal of Applied Physics, 28, 9, 1622-1628 (1989); Proceedings of SPIE, 682, 187-190 (1986)).

When the phase matching between modes is utilized, the conversion efficiency largely changes according to differences from the set values of the waveguide thickness and temperature, thereby making it difficult to stably manufacture practical devices.

On the other hand, when Cherenkov radiation is utilized, the conversion efficiency does not largely vary according to changes in temperature and the waveguide thickness, and therefore a device with high conversion efficiency showing promise for the practical use thereof.

FIG. 4 is a graph showing the relationship between the second-order polarizability $\beta$ and the wavelength at the absorption edge of the molecules of well known organic nonlinear optical materials. In the graph, POM is 3-methyl-4-nitropyridine-1-oxide, m-NA is m-nitroaniline, MNA is 2-methyl-4-nitroaniline, and DANS is 4-dimethylamine-4'-nitrostilbene (since DANS forms centrally symmetric crystals, when used as a crystal thereof, it exhibits no wavelength conversion property).

FIG. 4 indicates that, with an increase in the conjugated system and wavelength at the absorption edge of the molecules, the value of $\beta$ markedly increases.

Generally, the efficiency of converting optical wavelength is proportional to the square of the value of $\beta$. This indicates that the use of materials having longer wavelength at the absorption edge is more advantageous for raising the conversion efficiency.

Actually, the wavelength of the fundamental waves used in nonlinear optical devices lies in the range of 0.7 $\mu$m to 1 $\mu$m, i.e., the wavelength of a YAG laser light or a semiconductor laser light.

Considering that the wavelength of the second harmonic wave is half of that of a fundamental wave, nonlinear optical materials are required to transmit the second harmonic light so as not to absorb it. Therefore, in the prior art, it has been considered that materials having a wavelength at their absorption edge of about 0.5 $\mu$m or less are needed for converting the wavelength of a YAG laser light, and materials having a wavlength at their absorption edge of about 0.45 to about 0.35 $\mu$m or less are needed for converting the wavelength of a semiconductor laser light. (see e.g., "Nonlinear Optical Properties of Organic Molecules and Crystals Vol.1" (1987), D. S. CHEMLA et al., Academic Press).

Various materials have been examined which have a wavelength at their absorption edge of 0.45 to 0.35 $\mu$m and have a large $\beta$ value, but materials having a large $\beta$ value applicable for practical use have not yet been obtained.

Therefore, devices using such conventional nonlinear optical materials do not have sufficient conversion efficiency, which leads to a drawback in that the devices have low strength of light when used as light sources for an optical disc driver, a laser beam printer and so on.

SUMMARY OF THE INVENTION

The nonlinear optical device of this invention, which overcomes the above-discussed and numerous other disadvantages and deficiencies of the prior art, comprises: a nonlinear optical material, the material transmitting a fundamental wave and generated higher harmonics, and having optical absorption maximums based on an electronic transition between the wavelengths of the fundamental wave and the generated higher harmonics.

In a preferred embodiment, the nonlinear optical materials are single crystals, or polymers, or composite materials prepared by dispersing a low molecular weight nonlinear optical material in transparent polymers.

In a preferred embodiment, the nonlinear optical materials are those represented by any of the following structural formulae:

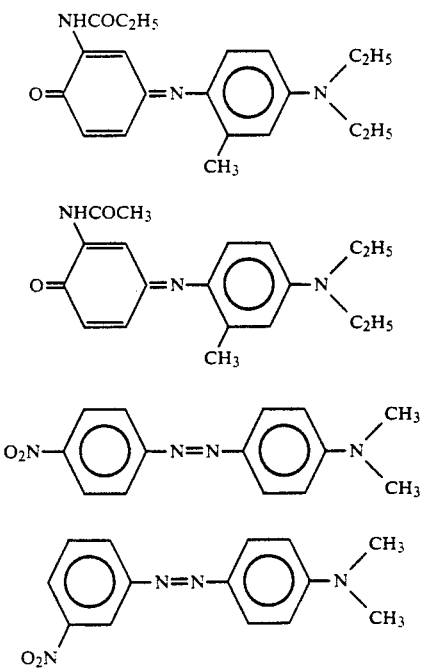

Thus, the invention described herein makes possible the objective of providing nonlinear optical devices having high conversion efficiency.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
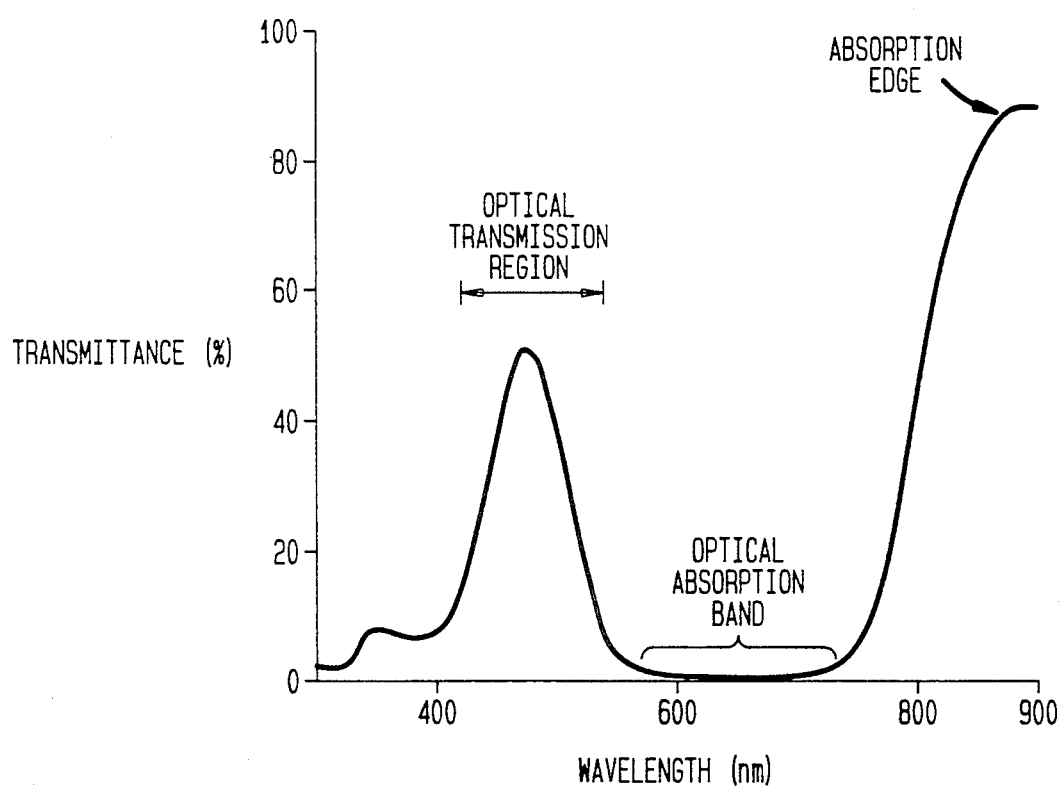
FIG. 1 is a graph showing the optical transmission spectrum of a thin film material of the present invention.

The nonlinear optical device of the present invention uses nonlinear optical materials which transmit a fundamental wave of input light and higher harmonics of output light, and have optical absorption maximums based on electronic transitions between the wavelengths of the fundamental wave and the higher harmonics. As a system of the device, a Cherenkov type device is adopted in which wavelength-converted light is propagated only in a short distance within the nonlinear optical materials. This is attributable to the following fact: since in the optical transmission region between two optical absorption maximums, there occurs some optical absorption due to broadening of an absorption band, as the distance in which light is propagated is extended, the optical absorption of higher harmonics increases, thereby making it impossible to efficiently emit higher harmonics.

As nonlinear optical materials of the present invention any of amorphous low molecular weight materials, single crystal low molecular materials, polymeric materials or composite materials prepared by dispersing a low molecular weight nonlinear optical material in a transparent polymer may be used, but the use of the single crystal low molecular weight materials, the polymeric materials, or the composite materials is preferable due to the high conversion efficiency thereof.

Further, as nonlinear optical materials for converting optical wavelength, an indophenol type compound that is a blue dye and an azobenzene type compound that is a red dye have been studied as a molecule which has a wavelength at its absorption edge of about 800 nm, an optical transmission region between wavelengths of 350 and 500 nm, and a large $\beta$ value; and a molecule which has a wavelength at its absorption edge in the range of 580 to 700 nm, an optical transmission region between wavelengths of 300 and 400 nm, and a large $\beta$ value, respectively. This study indicated that compounds represented by the following structural formulae (hereinafter, referred to as compound 1, compound 2, compound 3, and compound 4) had high efficiency of converting optical wavelength and showed other preferable properties.

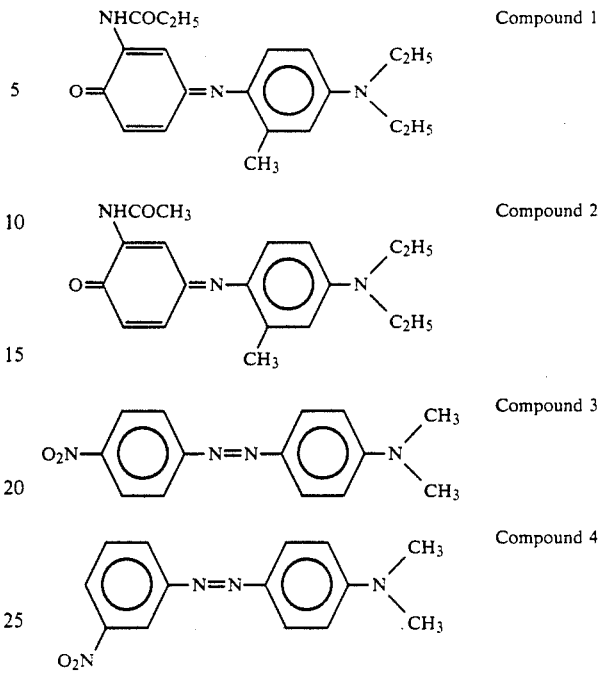

According to the present invention, a highly efficient optical wavelength converter can be realized by the use of materials having a wavelength at their absorption edge longer than that of higher harmonics which have been considered unsuitable for wavelength conversion materials in the prior art. The reason for this is now to be described.

The optical absorption by organic molecules can be explained in terms of the molecular orbitals of the molecules. Energy required for the transition from a ground level to an excited level of the molecular orbital is observed as optical absorption.

The ground level and the excited level of molecules generally have a band structure due to the effect of the vibration, the rotation, etc., of the molecules.

When a first excitation band and a second excitation band do not overlap at all or slightly overlap each other, an optical absorption spectrum has two optical absorption maximums in decreasing order of wavelength, and an optical transmission region appears between wavelengths of the first optical absorption maximum and the second optical absorption maximum. Generally, a third absorption maximum and that of more than the third are also observed. If the wavelength-converted light has a wavelength within this optical transmission region, this light can be emitted without being absorbed by a nonlinear optical material.

Since a fundamental wave and wavelength-converted light have been used in the prior art both of which have a wavelength longer than that at which almost no absorption is observed (a wavelength at its absorption edge) and longer than that of the first optical absorption maximum of the materials, only materials with a small $\beta$ could be used. As compared with this, in the present invention, since only a fundamental wave is required to have a wavelength longer than that at the absorption edge of nonlinear optical materials, nonlinear optical materials having a longer absorption edge than that of conventional one and therefore having a large $\beta$ value can be used for an optical wavelength converter, which leads to devices having conversion efficiency higher than conventional ones.

This invention will be further illustrated by reference to the following example.

EXAMPLE 1

A process for the synthesis of compound 1, the results of the evaluation thereof by a powder method, and the properties of an optical wavelength converter are shown below.

The Synthesis of Compound 1

First, 3.02 g of a compound represented by the following structural formula, and

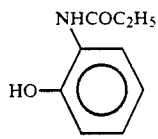

5.52 g of a compound represented by the following structural formula

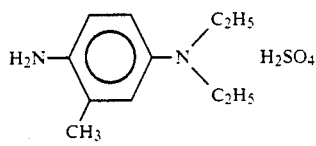

were added to 50 ml of ethanol, followed by stirring at room temperature, after which an aqueous solution prepared by dissolving 3.4 g of silver nitrate in 15 ml of water was added by drops.

Next, 15 ml of 28% aqueous ammonia was added therein, and then an aqueous solution prepared by dissolving 10.5 g of silver nitrate in 10 ml of water was added by drops therein, after which the mixture was allowed to react at 50° C. for 2 hours.

The reaction mixture was subjected to column purification by chloroform to obtain 4.07 g of a refined compound 1 represented by the following structural formula.

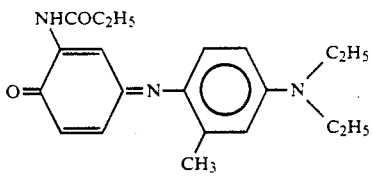

The above compound has a melting point of 106° to 109° C., and wavelengths at optical absorption maximums (in ethanol) of 648 nm, 373 nm, 299 nm, etc.

The Evaluation By a Powder Method

This compound was evaluated for the strength of second harmonic by the powder method of Kurz et al. (J. Appl. Physics., 39, 3798-3813 (1968)).

By the use of pulse YAG laser light as a fundamental wave, a wavelength conversion property about 5 times greater, relative to urea, was observed.

FIG. 1 shows the transmission spectrum of a thin film sample prepared by holding the compound 1 between glass substrates.

FIG. 1 shows that the wavelength at the absorption edge of this material is about 860 nm (defined as a wavelength at which transmittance is 95%). Further, an optical transmission region is observed between wavelengths of 420 and 540 nm. This region is present between wavelengths of the first optical absorption maximum (648 nm) and the second optical absorption maximum (373 nm) and therefore exhibits an optical transmissive property. The transmittance of this optical transmission region depends on the structure of the electronic level of molecules, and can further be improved by optimizing the structure of the molecules.

Optical Wavelength Converter

This compound 1 was crystallized in hollow glass fiber with a core diameter of about 1.5 μm, and a cladding diameter of 500 μm, and measured for the wavelength conversion properties.

Figure 2:
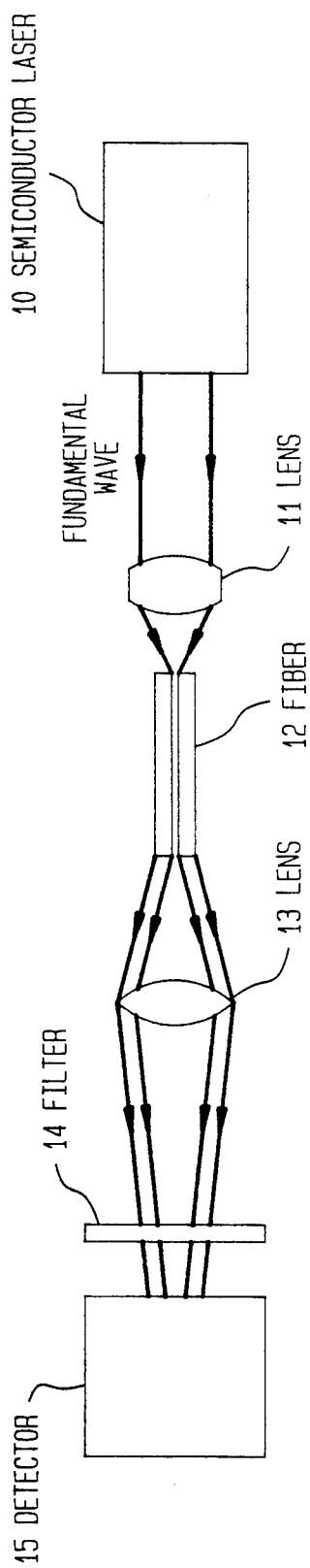
FIG. 2 is a diagram of a fiber type optical wavelength converter and the system of measurement of the properties thereof.

FIG. 2 shows the system of measurement thereof.

The light emitted from a semiconductor laser 10 is converged by a lens 11 and then coupled to a fiber 12. The fundamental light coupled to the fiber 12 is converted to generate a second harmonic. The second harmonic light is emitted in a ring pattern by so-called Cherenkov radiation. Since the second harmonic light is emitted from a core made of nonlinear materials to a cladding which almost completely transmits the second harmonic light, this device is advantageous in that the amount of light lost in nonlinear optical materials can be more reduced when compared with devices using phase matching between modes in which a fundamental wave and second harmonic are propagated within the same core.

The wavelength-converted light is converged by a lens 13 to be measured for the light strength by a detector 15. On the other hand, the unconverted light is cut by a filter 14.

By the use of this system of measurement, with a fundamental wave having a wavelength of 880 nm and a strength of 100 mW, a second harmonic having a wavelength of 440 nm and a strength of 0.2 mW was observed, and the conversion efficiency was 0.2%.

The conversion efficiency was not so high, but this can be further improved by the crystal orientation in the fiber and optimum design of the core diameter.

EXAMPLE 2

By the use of a commercially available azobenzene type compound 4 represented by the following structural formula, the optical transmission spectrum thereof was measured.

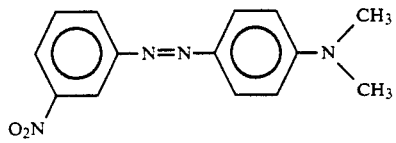

The thin film sample of this compound has a wavelength at the absorption edge of about 580 nm, and an optical transmission region was observed between wavelengths of 320 nm and 380 nm. Further, this compound was evaluated by the powder method in the same manner as in Example 1. As a result, a wavelength conversion property about 6 times greater, relative to urea, was observed.

Next, this compound was crystallized in hollow glass fiber with a core diameter of about 1.5 μm and a cladding diameter of 700 μm to prepare an optical wavelength converter.

The wavelength conversion properties were measured using the same optical system as that used in Example 1, except that a titanium sapphire laser with a wavelength of 700 nm was used as a light source. With a fundamental wave having a strength of 100 mW, a second harmonic having a strength of 0.25 mW was observed, and the conversion efficiency was 0.25%.

EXAMPLE 3

Figure 3:
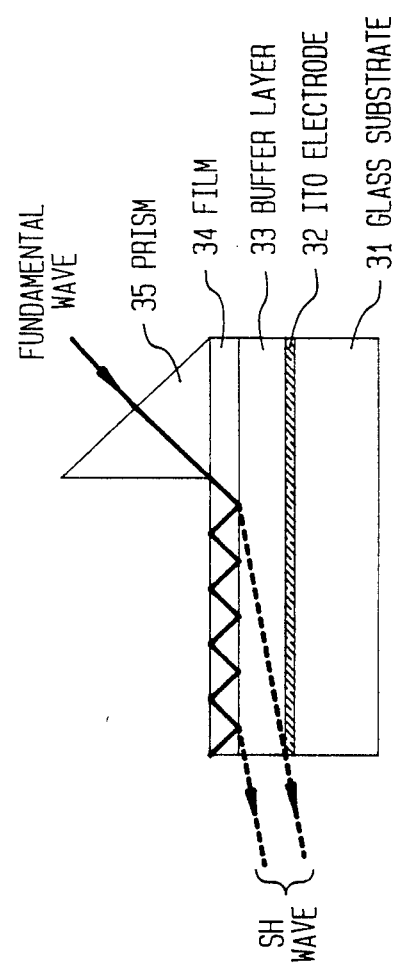
FIG. 3 is a schematic sectional view of the structure of a device of the present invention.
Figure 4:
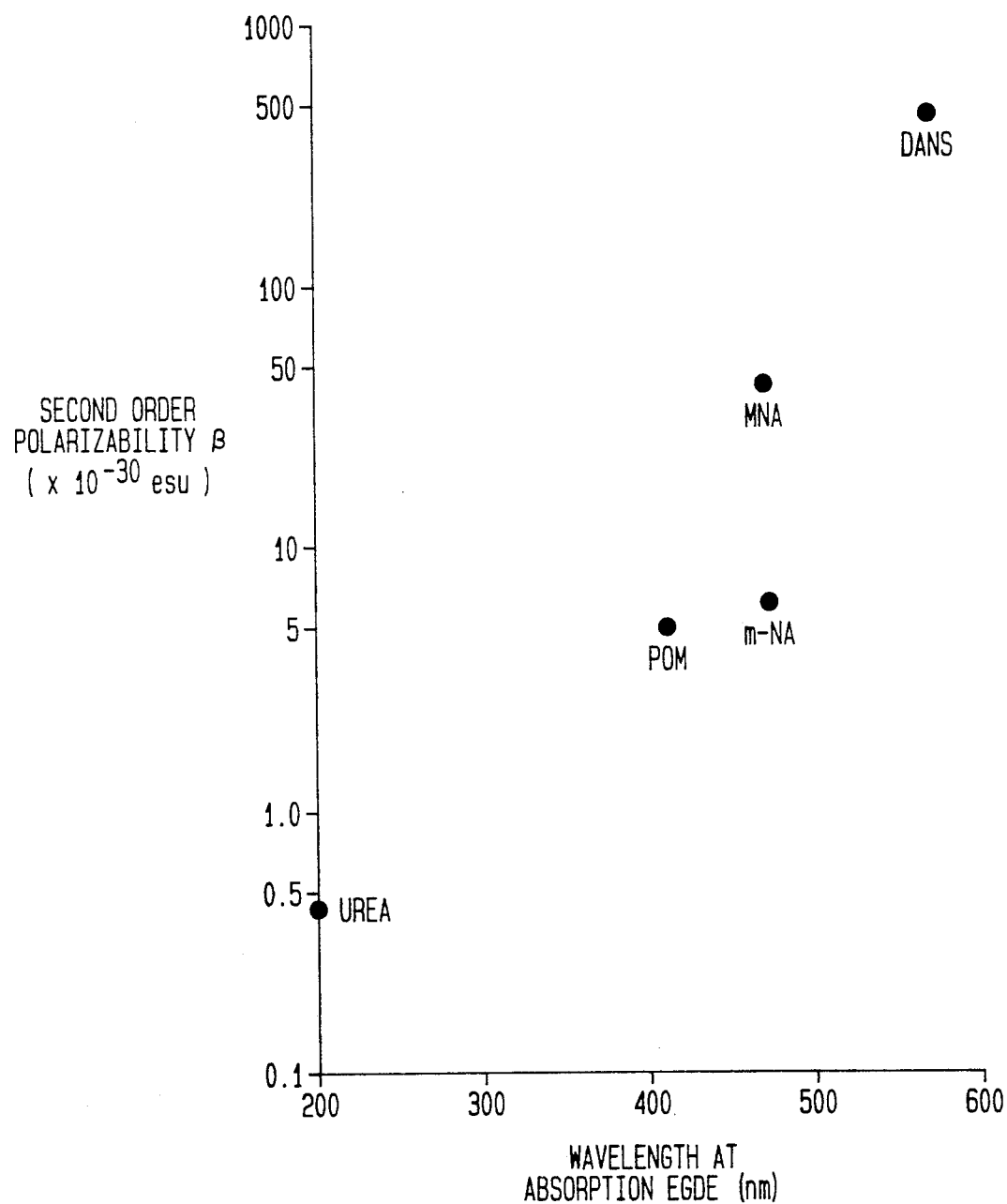
FIG. 4 is a graph showing the relationship between the second-order polarizability $\beta$ and the wavelength at the absorption edge of conventional typical optical wavelength conversion materials.

FIG. 3 shows an example of an optical wavelength converter prepared by dispersing 20 wt % of nonlinear optical monomer molecules in a polymer.

PMMA (polymethyl methacrylate) and a form of compound 1 were used as the polymer and the nonlinear optical material, respectively.

On a glass substrate 31, an ITO (indium tin oxide) electrode 32 was formed by vacuum evaporation. On this electrode, an $SiO_2$ film 33 was formed by sputtering as an intermediate layer, on which a film 34 was formed by spin coating, and then subjected to baking at about 50° to 70° C. to form a secondary optical waveguide. Then, a glass substrate with an ITO electrode was pressed thereon to apply an electric field of 50 to 400 V and raise the temperature to 90° to 105° C. to achieve poling.

After poling, the upper electrode was removed from the sample, and then a prism 35 was disposed thereon as shown in FIG. 3 to measure the wavelength conversion properties.

In this example, a pulse light source by a dye laser with a wavelength of 985 nm was used. With a fundamental wave having a strength of 40 kW, a second harmonic having a strength of 20 mW was observed.

Considering the coupling efficiency of the prism and waveguide loss, the conversion efficiency of the device was 0.05%.

EXAMPLE 4

An indophenol type compound 2 represented by the following formula was synthesized in the same manner as that in Example 1.

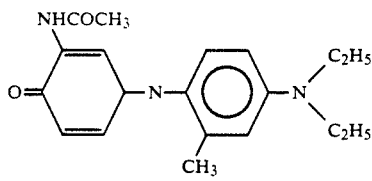

The wavelength at the absorption edge of this compound was about 860 nm, and an optical transmission region was observed between wavelengths of 415 and 535 nm.

The measurement of this material by the powder method indicated that the secondary wavelength conversion property was not observed at all and that the material had a centro symmetric crystal structure. Therefore, under the same conditions as those in Example 3, the material was dispersed in PMMA to prepare a device.

A pulse light source by a dye laser with a wavelength of 985 nm was used. With a fundamental wave having a strength of 40 kW, a second harmonic having a strength of 25 mW was observed.

Considering the coupling efficiency of the prism and waveguide loss, the conversion efficiency of the device was 0.06%.

EXAMPLE 5

By the use of a commercially available azobenezene type compound 3 represented by the following structural formula, the light transmission spectrum thereof was measured.

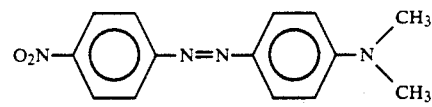

The wavelength at the absorption edge of the thin film sample of this compound was about 660 nm, and an optical transmission region was observed between wavelengths of 360 nm and 420 nm.

The measurement of this material by the powder method indicated that the secondary wavelength conversion property was not observed at all and that the material had a centre-symmetric crystal structure. Therefore, under the same conditions as those in Example 3, the material was dispersed in PMMA to prepare a device.

In this example, a pulse light source by a dye laser with a wavelength of 780 nm was used. With a fundamental wave having a strength of 40 kW, a second harmonic having a wavelength of 390 nm and a strength of 10 mW was observed.

Considering the coupling efficiency of the prism and waveguide loss, the conversion efficiency of the device was 0.03%.

COMPARATIVE EXAMPLE

The same device was prepared by dispersing 20 wt % of MNA in PMMA.

A fundamental wave having a strength of 40 kW is emitted into this device by a pulse YAG laser, and the strength of the second harmonic was measured and found to be only 2 mW. Considering the coupling efficiency of the prism and waveguide loss, the conversion efficiency of the device was 0.005%, i.e., about a one order smaller value.

Consequently, by harmonizing the wavelength of the optical transmission region between two optical absorption maximums with the wavelength of the second harmonic light, an optical wavelength converter can be realized by the use of materials with a long wavelength at their absorption edge and large second-order polarizability $\beta$ value, resulting in a device with a conversion efficiency higher than conventional ones.

In examples of the present invention, a process is used in which low molecular weight nonlinear molecules are dispersed in polymers, but polymers having molecules with nonlinear optical properties at its side chains and/or cross-linked polymers may be used.

As low molecular weight molecules with nonlinear optical properties, compounds 1, 2, 3, and 4 are herein used, but other molecules may be used which have a large second-order polarizability $\beta$ value and an optical transmission region between wavelengths of optical absorption maximums with respect to second harmonics, assumes configurations without centrosymmetry when used as crystals, and have large nonlinear constants.

Further, in the examples of the present invention, a device for second harmonic generation is described, but, for example, the devices of the present invention can be used for sum frequency generation and the like.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical wavelength converter for converting a fundamental wave into a higher harmonic, said optical wavelength converter comprising a nonlinear optical material having at least a first optical absorption maximum and a second optical absorption maximum, said first optical absorption maximum having a longest wavelength and said second optical absorption maximum having a second longest wavelength among optical absorption maximums based on an electronic transition, wherein said fundamental wave has a wavelength which is longer than the wavelength of said first optical absorption maximum and is propagated at a transmittance of 95% or more; and said higher harmonic has a wavelength of an optical transmission region between said first optical absorption maximum and said second optical absorption maximum and is propagated at a transmittance of 10% or more.

2. An optical wavelength converter according to claim 1, wherein said nonlinear optical material is selected from the group consisting of a single crystal, a polymer, and a composite material prepared by dispersing a low molecular weight nonlinear optical material in a transparent polymer.

3. An optical wavelength converter according to claim 1, wherein said nonlinear optical material is represented by any of the following structural formulae:

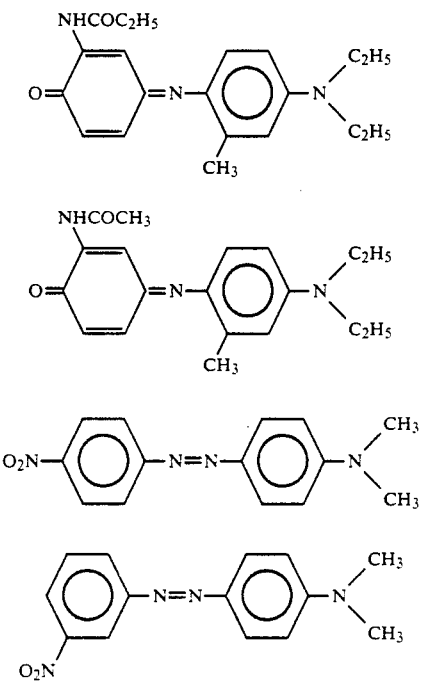

* * * * *